(12) United States Patent
Theriault

(10) Patent No.: US 7,360,636 B2
(45) Date of Patent: Apr. 22, 2008

(54) ALTERNATE PACKAGE FLIP-OVER DEVICE

(76) Inventor: Dominic Theriault, 19, Dupuis, St. Jacques, Quebec (CA) J0K 2R0

( * ) Notice: Subject to any disclaimer, the term of this patent is extended or adjusted under 35 U.S.C. 154(b) by 54 days.

(21) Appl. No.: 11/403,958

(22) Filed: Apr. 14, 2006

(65) Prior Publication Data
US 2007/0240969 A1    Oct. 18, 2007

(51) Int. Cl.
*B65G 47/24* (2006.01)
(52) U.S. Cl. .................. 198/403; 198/402; 198/407
(58) Field of Classification Search ........ 198/398–403, 198/406, 407, 411, 412; 271/65, 186
See application file for complete search history.

(56) References Cited

U.S. PATENT DOCUMENTS

| 3,970,202 | A |   | 7/1976  | Speggiorin et al. |
|-----------|---|---|---------|-------------------|
| 4,124,128 | A |   | 11/1978 | Adams et al.      |
| 4,264,255 | A |   | 4/1981  | Saro et al.       |
| 4,384,813 | A |   | 5/1983  | Smith et al.      |
| 4,699,367 | A | * | 10/1987 | Russel .......................... 271/65 |
| 4,784,558 | A |   | 11/1988 | Toriyama          |
| 4,838,747 | A |   | 6/1989  | Morisod           |
| 5,078,260 | A |   | 1/1992  | Bensberg et al.   |
| 5,106,075 | A | * | 4/1992  | Wafford et al. ............. 198/403 |
| 5,820,335 | A |   | 10/1998 | Croteau et al.    |
| 5,842,327 | A |   | 12/1998 | Schwede           |
| 6,179,548 | B1|   | 1/2001  | Lukes et al.      |
| 6,419,222 | B1| * | 7/2002  | Morrison et al. ........... 271/186 |

\* cited by examiner

*Primary Examiner*—James R. Bidwell
(74) *Attorney, Agent, or Firm*—Equinox Protection; Franz Bonsang, Patent Agent

(57) ABSTRACT

An alternate package flip-over device includes an intermittently operable primary conveyor feeding batches of packages to a continuously operating secondary conveyor, and a flap for routing the batches to either a flip-over mechanism or to an intermediate transfer conveyor, the successive batches from the transfer conveyor and the mechanism rejoining on a merging conveyor, alternate batches having been flipped in the mechanism.

20 Claims, 2 Drawing Sheets

ALTERNATE PACKAGE FLIP-OVER DEVICE

FIELD OF THE INVENTION

The present invention relates to an alternate package flip-over device of the kind particularly although not exclusively employed in the handling of packages, for example folded boxes issuing in a continuous flow from a folder-gluer machine. Generally, such packages are of non-uniform thickness having one edge, for example the leading edge, thicker than the other edge, for example the trailing edge.

BACKGROUND OF THE INVENTION

There is no existing device that allows flipping-over of batches of packages flowing in a continuous stream without breaking such package stream. Instead, it is well known in the art to stack such boxes for packing and in this respect it is necessary for stability to ensure that the height of the stack is substantially constant. Accordingly, in view of the variation in thickness as previously mentioned, it becomes important to vary the orientation of the packages to compensate for the difference in thickness. Such variation may be achieved in a number of ways as evidenced by the prior art. For example, U.S. Pat. No. 3,970,202 to Speggiorin et al discloses an apparatus for stacking packages or folded boxes which involves preparing individual stacks and flipping consecutive stacks such that they assume alternately and oppositely disposed directions thereby avoiding imbalance. U.S. Pat. No. 6,179,548 to Lukes et al also describes a similar proposal for rotating individual stacks in order to compensate for unevenness. U.S. Pat. No. 4,124,128 to Adams et al individual boxes are orientated alternately for the same purpose, namely to provide for substantial uniform height of the resultant bundle and thus stability. A further example of known apparatus for creating stable stacks of folded boxes is to be found in U.S. Pat. No. 5,078,260 to Bensberg et al which teaches the interleaving of such boxes from two sides of a merging mechanism and U.S. Pat. No. 4,384,813 to Smith et al proposes the re-orientation of the boxes on an individual basis prior to final stacking and packing. All these examples require complex machinery usually dedicated to a particular size and shape of folded box; and furthermore, they are not compatible for use with existing packing and/or stacking machines that are usually fed with a continuous stream of packages of uniform thickness.

Therefore, a package flip-over device which alternately reorient batches of non-uniform thickness packages of the stream without breaking the same would prove to be useful to fit upstream of the existing packing machines. None of the existing devices allow such a formation of a stream of packages with alternating batches of flipped-over and unflipped packages, especially with the number of package(s) per batch being selectable by the operator.

Accordingly, there is a need for an improved alternate package flip-over device for use in a stream or shingle of packages to flip-over alternate batches of packages of the stream.

SUMMARY OF THE INVENTION

It is therefore a general object of the present invention to provide an improved alternate package flip-over device.

A further object of the present invention is to simplify the re-orientation step of flipping packages, or batches thereof over, without effectively breaking the stream of packages for further handling thereof.

Another object of the present invention is to provide for versatility in operation by varying the rate of re-orientation, as well as the quantity of packages per batch, which could be only one package per batch.

A still further object of the present invention is to provide a compact and relatively simple flip-over device.

Accordingly the invention provides an alternate package flip-over device including a primary conveyor adapted in use for intermittent operation to feed a number of packages to a secondary conveyor adapted for continuous operation, a flip-over mechanism downstream of the secondary conveyor provided with a receiving section and a delivery section each comprising guides adapted in use to guide the packages during travel through the respective sections, a tertiary direction-reversing conveyor associated with the mechanism intermediate the receiving and delivery sections, a fourth transfer conveyor disposed beneath the mechanism, a flap disposed between the secondary conveyor and both the receiving section of the flip-over mechanism and the fourth transfer conveyor, for alternating in use the passage of successive numbers of the packages to the flip-over mechanism or to the fourth transfer conveyor, and a monitoring control associated with the primary conveyor to detect the number of packages in use passing thereover and to stop and start said conveyor intermittently dependent upon detection of a preselected number of packages.

The primary conveyor is adapted to operate in an appropriate sequence with the actuation of the flap whereby the preselected number of packages are fed to the flip-over mechanism by the continuously operating secondary conveyor via the flap or fed to the fourth transfer conveyor. In the case when the packages are not fed to the flip-over mechanism, they are fed via the fourth conveyor directly onward to a merging conveyor to which those packages passing through the mechanism and being flipped are also fed in successive batches of packages. Accordingly the resulting flow or stream of conveyed packages comprises alternately oriented overlapping batches of packages, which is proved useful when ultimately stacking the differing alternate orientation downstream of the device to ensure stability and uniformity in stack height.

In one embodiment, the alternate package flip-over device further includes the merging conveyor downstream of the delivery section and the fourth transfer conveyor for successively receiving the batches of packages there from. Conveniently, a receiving end of the merging conveyor is adjustable in height relative to, preferably below, a level of the adjacent fourth transfer conveyor. Typically, at least one of the fourth conveyor and the merging conveyor includes a package stream guiding mechanism positioned there above.

The monitoring control may incorporate a laser to count the number of packages and is adapted to control the operation of the primary conveyor in conjunction with the operation of the flap and that of the tertiary direction-reversing conveyor. The number of packages per batch may be preselected in accordance with requirements and the physical characteristics, viz. the shape and size of the packages. Depending on the amount of packages per batch and their physical characteristics, each batch can be momentarily either compressed or stretched by varying the respective speeds of the different conveyors to enable the smooth processing thereof. The operation of the tertiary conveyor is interlinked with the operation of the primary conveyor and the flap, whereby a sequence of events results in the even merging and flow of the packages.

The guides may be constituted by a plurality of resiliently-loaded rollers or pulleys which apply the appropriate pressure to the packages during their passage through the respective receiving and delivery sections of the flip-over mechanism. A further conveyor is provided as part of the guides to assist the conveyance of the packages through the receiving and delivery sections.

Conveniently, the tertiary conveyor includes two belts between which the packages are held and conveyed sequentially in opposite directions. Typically, one of the belts of the tertiary conveyor is supported by a plurality of fixed rollers and the other belt is at least partially supported by a plurality of resiliently-loaded rollers. Conveniently, the two belts gradually join each other to form an opened mouth of the tertiary conveyor adjacent the receiving and delivery sections. Typically, a lower end portion of the two belts is angularly positioned relative to a generally adjacent vertical portion thereof and toward the delivery section.

In one embodiment, the device further includes a controller computer connected to the different conveyors and the receiving and delivery sections for operation thereof. Conveniently, the device includes a plurality of package sensors located on the different conveyors and the receiving and delivery sections, the plurality of sensors detecting the packages and being connected to the controller computer.

A feed conveyor and a final receiving conveyor are provided in a package handling installation of which the device forms a part. It will further be understood that suitable support structures are also provided on which the various elements of the device are mounted in practice.

Other objects and advantages of the present invention will become apparent from a careful reading of the detailed description provided herein, -with appropriate reference to the accompanying drawings.

BRIEF DESCRIPTION OF THE DRAWINGS

Further aspects and advantages of the present invention will become better understood with reference to the description in association with the following Figures, in which similar references used in different Figures denote similar components, wherein.

DETAILED DESCRIPTION OF THE PREFERRED EMBODIMENTS

Figure 1:
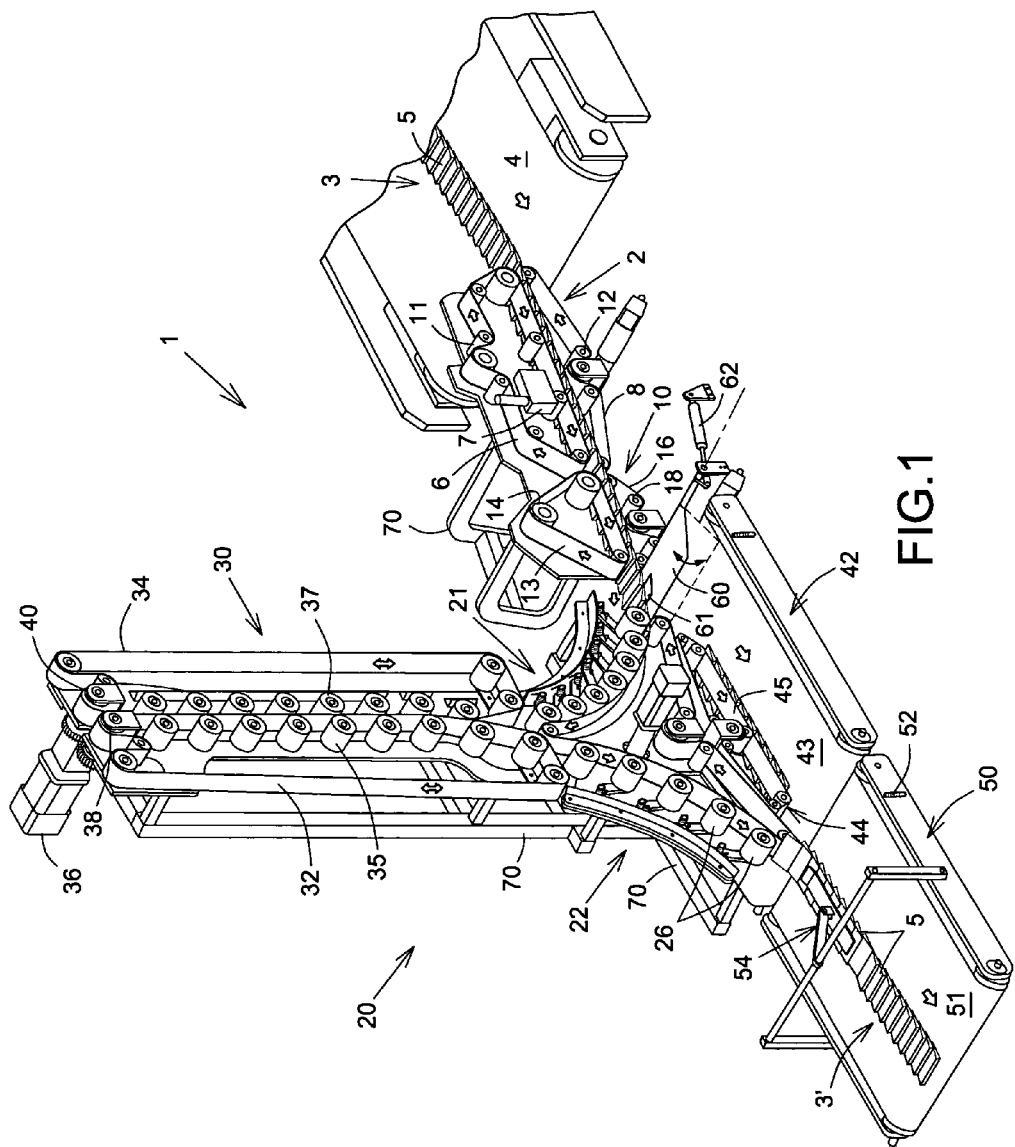
FIG. 1 is a perspective front view of an alternate package flip-over device in accordance with an embodiment of the present invention.

With reference to the annexed drawings the preferred embodiment of the present invention will be herein described for indicative purpose and by no means as of limitation.

Referring to the drawings, there is illustrated generally at 1 an alternate package flip-over device in accordance with an embodiment of the present invention including a primary conveyor 2 to which in practice a stream 3 (or shingle) of packages 5 is fed by a feeder conveyor 4. In this specific example the packages are folded boxes delivered from a folder-gluer machine or the like. The primary conveyor 2 is constituted by a pair of belt conveyors incorporating upper and lower drive belts 6, 8 reeved around a set of rollers 11, 12 respectively, in practice the packages 5 being conveyed between the two belts 6, and 8 for delivery to a secondary conveyor 10. A controller 7 incorporating a laser is provided for the primary conveyor 2 and in use counts the number of packages 5 within the confines of the conveyor and is adapted intermittently to stop and start the conveyor in accordance with a predetermined counting and timing pattern.

The secondary conveyor 10 is of a similar type to the primary conveyor 2 in that it comprises two top and bottom drive belts 13, 14 again reeved around respective sets 16, 18 of rollers, in practice the stream of packages 5 passing between the belts 13, 14. In general operation of the device, the conveyor 10 is operated continuously.

A flip-over mechanism shown at 20 includes a receiving section 21 and a delivery section 22 sharing a drive belt 24 and each having a set of spring-loaded jockey wheels, pulleys or rollers 26 for applying pressure to the conveyed packages. Each section is accurately shaped in opposite directions as shown. Although not illustrated herein, it would be obvious to one skilled in the art that the spring-loaded rollers 26 could apply pressure to the packages 5 via a roller belt (not shown) for each receiving and delivery section 21, 22 (as described for the belt 34 of rollers 37 hereinbelow) without departing from the scope of the present invention.

Supermounted above the receiving and delivery sections 21, 22 of the flip-over mechanism 20 is a tertiary conveyor 30 comprising two drive belts 32, 34 driven by a motor 36 and drive rollers 38, 40, the packages being held in practice between the drive belts 32, 34. Belt 32 is typically rollably supported by a set of fixed rollers 35 while belt 34 is preferably at least partially rollably supported by a set of spring-loaded jockey rollers 37 to maintain pressure onto the packages conveying between the two belts 32, 34, irrespective of the package thickness; the opposite configuration as well as using resiliently loaded jockey rollers with both belts 32, 34 could also be considered without departing from the scope of the present invention. The tertiary conveyor 30 is substantially vertical and perpendicular to the primary and secondary conveyors 2, 10 and to the general flow plane of the stream 3.

A fourth transfer or by-pass conveyor 42, with belt 43, is disposed beneath the receiving and delivery sections 21, 22 of the flip-over mechanism 20 and a merging conveyor 50, with belt 51, is arranged adjacent the delivery regions of both the fourth transfer conveyor 42 and the delivery section 22 of the mechanism 20 as can be seen from the drawings. The speed of the belt 51 of the merging conveyor 50 is typically set to ensure the proper reformation of the alternately flipped stream 3' of packages 5.

Figure 2:
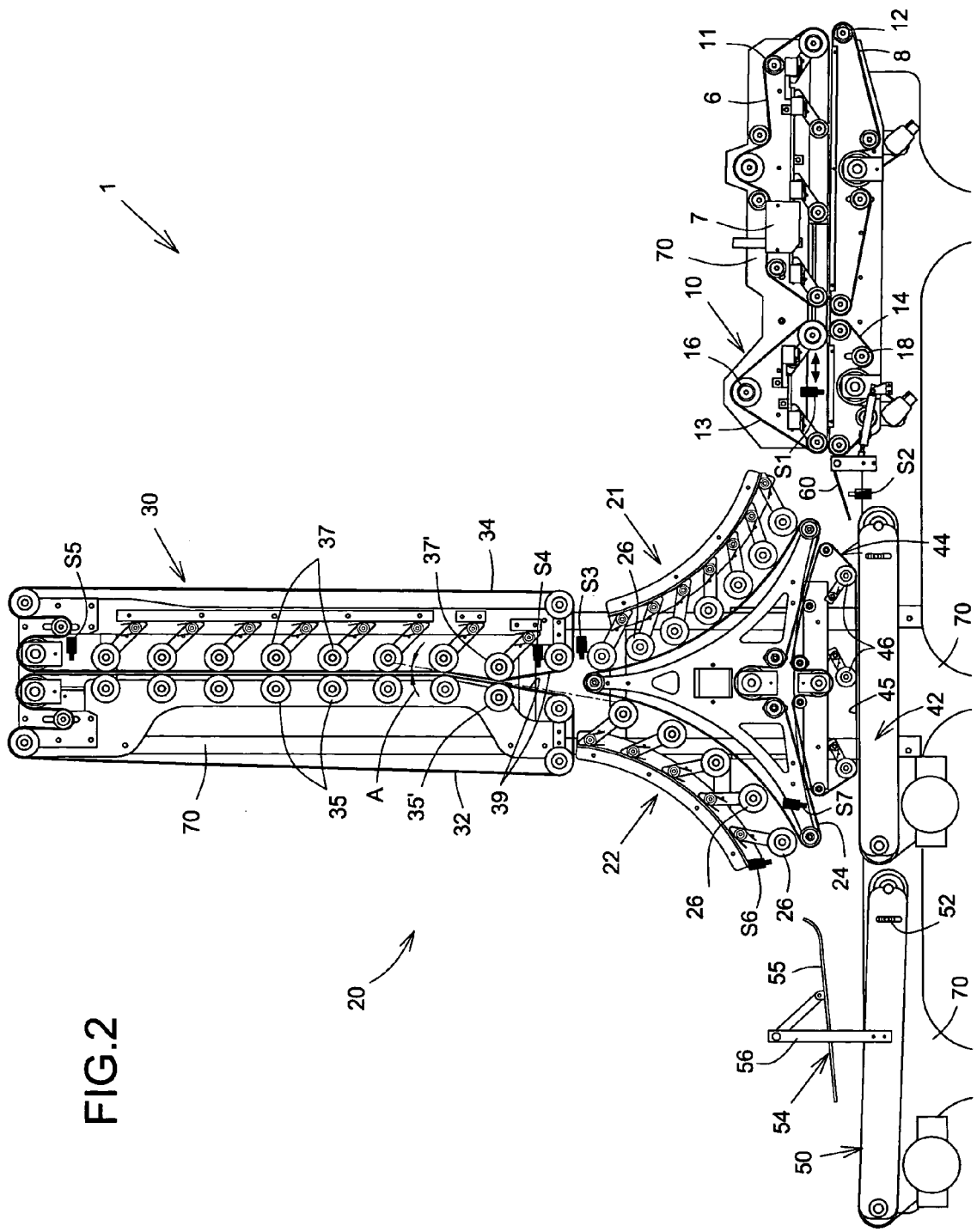
FIG. 2 is a front elevation of the device of FIG. 1.

In order to slow down batches of packages 5 reaching transfer conveyor 42 and the merging conveyor 50 after being temporarily accelerated while ensuring a uniform flow of packages 5 remain in stream therealong, the conveyors 42, 50 typically include respective package stream guiding mechanisms 44, 54. The package stream guiding mechanism 44 of the fourth conveyor 42 typically includes a top belt 45 supported, at least partially, by spring-loaded rollers 46; the belt 45 being driven at the same speed than the main belt 43 of the fourth conveyor 42. The package stream guiding mechanism 54 of the merging conveyor 50 typically includes a guiding plate 55 or skate adjustably mounted on a support structure 56. The guiding plate 55 is preferably slightly angled upwardly toward the upstream direction with an upwardly curved leading edge thereof to ensure efficiency, as best shown in FIG. 2. Obviously, the fourth conveyor 42 could include a package stream guiding mechanism similar to the one of the merging conveyor 50, and vice versa, without departing from the scope of the present invention.

A hinged flap 60 is provided intermediate the secondary conveyor 10 and both the receiving section 21 of the flip-over mechanism 20 and the fourth transfer conveyor 42 and is operable by means of a fluid operable cylinder 62, such as pneumatic, or electrically (not shown).

In operation, a stream 3 of packages 5, e.g. folded boxes from a folder-gluer machine (not shown) is fed on the feeder conveyor 4 to the device 1 and in particular to the primary conveyor 2, the stream being held between the belts 6 and 8 thereof. The stream 3 further flows towards the secondary conveyor 10 from right to left as viewed in the drawings. The controller 7 counts the number of packages 5 within the length of the conveying portions of the belts 6, 8 such that when a preset number, for example 10 as shown in FIG. 1, is present the conveyor 2 is stopped momentarily to retain the following packages, after the last package of the batch or pack, within the confines of the primary conveyor 2, the front portion of the stream continuing on into the secondary conveyor 10. It will be understood that the feeder conveyor 4 keeps on operating for the same time, and locally increases the density of the stream 3 before the restart of the primary conveyor. A first package sensor S1 mounted on the secondary conveyor 10 at a predetermined distance from the primary conveyor 2 and the controller 7 typically detects the interruption of the stream and allows the restart of the primary conveyor 2; the predetermined distance being the initial gap between successive batches of packages 5. The position of the first package sensor S1 (see FIG. 2) is typically adjustable relative to the primary conveyor 2 to control that initial gap.

The phasing of the intermittent stop and start regime is typically indirectly arranged to correspond with the timing of the operation of the flap 60, controlled by a second package sensor S2 typically located thereunder and detecting the beginning of the batch gap through a small flap window 61 or the like, which directs a divided part of the stream 3, say 25 packages in a batch (or 10 as shown in FIG. 1 or even down to a single package per batch), onto either the fourth transfer conveyor 42 for onward travel to the merging conveyor 50 or into the receiving section 21 of the flip-over mechanism 20. Although not specifically described herein, the actuation of the flap 60 could be directly sequential with the primary conveyor 2, with a pre-calculated delay. In the event that the flap 60 is in the position as shown in FIG. 2 (in dotted outline in FIG. 1) the unflipped batch flows directly onto the fourth transfer conveyor 42 for transmission to the merging conveyor 50. Once the flap 60 has been operated to assume the position shown in full outline in FIG. 1, the batch flows into the receiving section 21 of the mechanism 20. In that section 21 the batch is conveyed between the drive belt 24 and the wheels 26 into the tertiary conveyor 20 where they initially travel upwardly and are held or parked instantaneously whilst the direction of travel of the belts 32, 34 is reversed, the packages 5 being retained momentarily. Upon re-direction of the belts 32, 34, the packages 5 in the divided batch are fed into the delivery section 22 of the mechanism 20 and in the process the top of the batch now becomes the bottom of the batch and accordingly the batch has been flipped within the mechanism. In order to facilitate the guiding transfer of packages 5 from the receiving section 21 into the tertiary conveyor 30, the two belts 32, 34, starting from a location adjacent the intersection of the receiving and delivery sections 21, 22, gradually join each other, at a throat region, to form a downwardly oriented opened mouth 39 or inwardly tapering package entry of the tertiary conveyor. In order to facilitate the guiding transfer of packages 5 from the tertiary conveyor 30 to the delivery section 22, in addition to the opened mouth 39, the two belts 32, 34 are slightly angled (see angle A in FIG. 2) toward the delivery section 22 by the shifted positioning toward the delivery section side of the respective lower throat defining roller 35', 37' of each side of the tertiary conveyor 30 relative to the substantially vertically aligned respective rollers. The packages 5 coming out of the tertiary conveyor 30 are then angled along angle A such that they naturally point in the direction of the delivery section 22. Although not illustrated herein, it would be obvious to one skilled in the art that another flap mechanism could be consider at the intersection of both receiving and delivery sections 21, 22 to alternatively ensure proper flowing of the packages 5 between the two sections and the tertiary conveyor 30.

In order to efficiently control operation of the flip-over mechanism 20, a third package sensor S3 is typically located between the receiving section 21 and the tertiary conveyor 30, at the entrance of the opened mouth 39, to assess that the last package of a batch quit the receiving section 21 such that the speed of the different conveyors 10, 21, 22, 30, 42 can be changed if ever required. A following fourth package sensor S4 typically located within the opened mouth 39 detects that the last package of a batch has entered the tertiary conveyor 30 to allow the reverse operation of the belts 32, 34. A safety fifth package sensor S5 is typically located toward the upper section of the tertiary conveyor 30 to ensure that no package reaches that point before its operation is reversed. In the occurrence of a package reaching that point, the operation of the device 1 will be stopped.

The batch of flipped packages 5 is conveyed within the delivery section 22 by the belt 24 and jockey wheels 26 thence to be delivered onto the merging conveyor 50 to rejoin the stream constituted by the previous batch(es) that flowed alternately from the mechanism and the fourth transfer conveyor. As can be seen from the illustration in FIG. 1 successive batches in the stream are alternately reversed, the respective leading edges being either thick or thin. The packages 5 lie in echelon into a reformed stream 3' on the merging conveyor for subsequent handling such as collection and collation downstream thereof for ultimate parceling into containers (not shown). In order to ease the merging of the successive batches of packages 5 on the merging conveyor 50 which could found to be awkward when a thick trailing edge of a preceding batch faces the following coming batch, the belt 51 of the merging conveyor 50 is typically angled or tilted down toward the receiving end thereof below a level of the transfer conveyor 42 via a slot adjustment mechanism 52 or the like, as shown in FIG. 2. This lowered receiving end of the belt 51, as well as the control of its speed, ensures that the leading end of the first package of a coming batch from the transfer conveyor 42 gets over the trailing edge of the last package of the previous batch from the flip-over mechanism 20 now on the merging conveyor.

In order to efficiently ensure overlap of alternate batches onto the merging conveyor 50, a sixth package sensor S6 located at the end of the delivery section 22 typically ensures that the last package of a flipped-over batch has been transferred onto the merging conveyor 50. Concurrently, a seventh package sensor S7 located at the end of the transfer conveyor 42 typically detects the presence of a first package of an unflipped batch. Sensors S6, S7 allow the control of the speed (and operation) of the each belt 43, 51 of the transfer and merging conveyors 42, 50 to ensure adequate overlap of successive batches of packages.

During operation of the device 1, the packages 5 of a same batch always remain in an overlap configuration, overstacked as shown in FIG. 1

As will be understood, the control of all the conveyors and the flap is centralized and sequenced, typically via a controller-computer or the like connected to the different package sensors S1, S2, S3, S4, S5, S6, S7, to provide the appropriate split flow regime that enables the flipping of the packages to take place in a smooth and trouble free manner and for merging of the batches to occur in a continuous manner. Accordingly, the controller timely adjusts the proper belt speed of the different conveyors. The number of packages in a batch is preselected in accordance with requirements having due regard to their size and shape. Separation of groups of batches may be effected in order to ensure smooth subsequent handling and to prevent any logjams or even sliding of packages reaching the merging conveyor 50 over one another, especially because of their relative speed, which is further controlled by the two package stream guiding mechanisms 44, 54.

It will further be understood that drive motors of suitable power rating are provided for the belt conveyors described.

A support structure for the device and all the conveying modules is provided and is shown diagrammatically at 70 in FIG. 2.

Although the present invention has been described with a certain degree of particularity, it is to be understood that the disclosure has been made by way of example only and that the present invention is not limited to the features of the embodiments described and illustrated herein, but includes all variations and modifications within the scope and spirit of the invention as hereinafter claimed.

I claim:

1. An alternate package flip-over device including a primary conveyor adapted in use for intermittent operation to feed a batch of packages to a secondary conveyor adapted for continuous operation, a flip-over mechanism downstream of the secondary conveyor provided with a receiving section and a delivery section each comprising guides adapted in use to guide the packages during travel through the respective sections, the mechanism further comprising a tertiary direction-reversible conveyor intermediate the receiving and delivery sections, a fourth transfer conveyor disposed beneath the mechanism, a flap disposed between the secondary conveyor and both the receiving section of the flip-over mechanism and the fourth transfer conveyor, for alternating in use the passage of successive batches of the packages to the flip-over mechanism or to the fourth transfer conveyor, and a monitoring control being associated with the primary conveyor for detecting the number of packages in use passing thereover and being adapted to stop and start the primary conveyor intermittently in accordance with the detection of a preset number of packages to create batches within a stream of packages and to actuate the flap whereby alternate batches are fed to the flip-over mechanism or to the fourth conveyor.

2. An alternate package flip-over device according to claim 1, further including a package sensor connected to the monitoring control and mounted on the secondary conveyor, the package sensor successively detecting a trailing end of each said batch of packages reaching the flap.

3. An alternate package flip-over device according to claim 2 wherein the monitoring control includes a laser for counting the number of packages.

4. An alternate package flip-over device according to claim 1 wherein the flip-over mechanism is substantially vertically arranged whereby a batch of packages in use travels upwardly and then downwardly by sequential directional operation of the tertiary conveyor, thereby to be flipped between the receiving and delivery sections.

5. An alternate package flip-over device according to claim 1 wherein the guides of the receiving and delivery sections of the flip-over mechanism comprise a plurality of resiliently-loaded wheels and a further conveyor operable in association therewith.

6. An alternate package flip-over device according to claim 5 wherein the conveyor is a belt conveyor and the guides are formed in an arcuate manner in opposite directions.

7. An alternate package flip-over device according to claim 1 wherein each of the primary and secondary conveyors comprises two belts between which the packages are held and conveyed.

8. An alternate package flip-over device according to claim 1 wherein the tertiary conveyor comprises two belts between which the packages are held and conveyed sequentially in opposite directions.

9. An alternate package flip-over device according to claim 8 wherein the one of the belts of the tertiary conveyor is supported by a plurality of fixed rollers and the other belt is at least partially supported by a plurality of resiliently-loaded rollers.

10. An alternate package flip-over device according to claim 8 wherein the two belts gradually join each other to form an opened mouth of the tertiary conveyor adjacent the receiving and delivery sections.

11. An alternate package flip-over device according to claim 10 wherein a lower end portion of the two belts is angularly positioned relative to a generally adjacent vertical portion thereof and toward the delivery section.

12. An alternate package flip-over device according to claim 1 wherein the flap is actuable sequentially with operation of the primary conveyor.

13. An alternate package flip-over device according to claim 11 wherein the flap is actuable sequentially and indirectly from operation of the primary conveyor with a package sensor detecting a trailing end of a batch of packages reaching the flap.

14. An alternate package flip-over device according to claim 12 wherein the flap is fluid operable.

15. An alternate package flip-over device according to claim 12 wherein the flap is electrically operable.

16. An alternate package flip-over device according to claim 1 further including a merging conveyor downstream of the delivery section and the fourth transfer conveyor for successively receiving the batches of packages therefrom.

17. An alternate package flip-over device according to claim 16 wherein a receiving end of the merging conveyor is adjustable in height relative to a level of the adjacent fourth transfer conveyor.

18. An alternate package flip-over device according to claim 16 wherein at least one of the fourth conveyor and the merging conveyor includes a package stream guiding mechanism positioned thereabove.

19. An alternate package flip-over device according to claim 1 further including a controller computer connected to the different conveyors and the receiving and delivery sections for operation thereof.

20. An alternate package flip-over device according to claim 19 further including a plurality of package sensors located on the different conveyors and the receiving and delivery sections, the plurality of sensors detecting The packages and being connected to the controller computer.

* * * * *